Patented Sept. 4, 1945

2,384,123

UNITED STATES PATENT OFFICE 2,384,123

UNSATURATED CARBONATE ESTERS AND POLYMERS THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application March 7, 1942, Serial No. 433,829

9 Claims. (Cl. 260—78)

This invention relates to a new class of unsaturated esters having unusual properties which render them valuable in various chemical arts.

Because of the indefinite scope and variation in the common usage of certain chemical expressions, it is necessary to define and limit such expressions which are used in the following specification and claims.

By all "polyhydroxy compounds" we mean compounds having two or more hydroxy groups which do not contain any free acid groups. These polyhydroxy compounds may have ether, thioether, amino, amido, or ester linkages between the reactive hydroxy groups. By ester linkages we mean a linking oxygen atom derived from the reaction between an acid and an alcohol. Thus, a carbonate R—O—CO—O—R contains two ester linkages.

By "simple polyhydroxy compounds" we mean polyhydroxy compounds which do not contain ester linkages between the reactive hydroxy groups such as resorcinol, ethylene glycol, glycerine, etc. Polyhydroxy ethers such as diethylene glycol or tripropylene glycol and the corresponding thio ethers are considered to be simple polyhydroxy compounds. The polyhydroxy compounds which contain ester linkages between the reactive hydroxy groups such as ethylene glycol monolactate (OH)—C$_2$H$_4$—CO—CH(OH)—CH$_3$, diethylene glycol diglycolate (OH)—CH$_2$COO—C$_2$H$_4$—OC$_2$H$_4$—O—CO—CH$_4$OH and castor oil are not considered to be within the scope of the term "simple polyhydroxy compound" due to the presence of one or more ester linkages between the hydroxy groups in such compounds.

The invention is particularly directed to esters of unsaturated alcohols having up to five carbon atoms in the molecule such as allyl, methallyl, crotyl, isocrotyl, propargyl, methyl ethynyl carbinyl, methyl vinyl carbinyl, tiglyl, angelyl, methyl allyl carbinyl or ethylallyl alcohols. The halogen substituted products of the above alcohols are also useful such as 2-chloroallyl, bromoallyl, and chlorocrotyl alcohols. Although the lower weight alcohols are preferred, other alcohols having up to 10 carbon atoms may be used, such as cinnamyl alcohol, phenyl propargyl, β-ethyl ethynyl, or β-isobutyl allyl alcohol.

The esters herein contemplated are esters of simple polyhydroxy aliphatic compounds which contain at least three hydroxy groups such as glycerol, alpha methyl glycerol, mannitol, erythritol, pentaerythritol, pinacol, dextrose, lactose, sucrose, starch, cellulose, polyvinyl alcohols, etc., or the halogen or amino, nitro, or other hydrogen substituted derivatives thereof.

A preferred group of these new unsaturated esters are those in which all of the hydroxyl groups of the polyhydroxy compound are esterified with the half ester of carbonic acid and the unsaturated alcohols. These neutral esters may be represented by the general formula

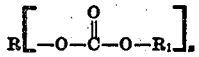

in which R is a saturated aliphatic hydrocarbon radical having a valence of $x$, R$_1$ is the radical derived from an unsaturated alcohol, and $x$ is a small whole number greater than two and less than seven. These esters contain the radical of only a single molecule of the simple polyhydroxy compound and will contain four ester linkages between a pair of unsaturated alcohol radicals.

The carbonate esters may be prepared by reaction of an unsaturated chloroformate such as allyl, or methallyl chloroformate with the polyhydroxy compound. The esters may also be prepared by reaction of the polyhaloformates of the polyhydroxy compound such as glycerol trichloroformate with the unsaturated alcohol. In like manner, mixed esters may be prepared by reaction of an unsaturated haloformate such as allyl chloroformate with a partial ester such as glycerol monoacetate, glycerol, diacrylate, erythritol diacetate, and the corresponding propionates, butyrates, methacrylates, stearates, oleates, etc., with the chloroformates of unsaturated alcohols. The same mixed esters may also be prepared by treating the hydroxy ester of a simple polyhydroxy compound with phosgene to form a polychloroformate which may then be reacted with an unsaturated alcohol.

In all preparations the chloroformates are first made by treating the hydroxy compound with phosgene at low temperatures, preferably between 0° C. and 20° C. The chloroformates are then added slowly to the alcohol or polyhydroxy compound also at temperatures between 0° C. and 20° C. and in the presence of an alkaline reagent such as pyridine or other cyclic tertiary amine or the oxides, carbonates, or hydroxides of sodium, potassium, barium, calcium, magnesium, or other metal. Inert diluents or solvents such as acetone, chloroform, benzene, water, etc., may be added to assist the reaction. The resulting product may be purified by washing with dilute acid and/or dilute salt solutions, for example, sodium carbonate and sodium chloride solutions, and/or water. The washed products may be freed of volatile impurities by topping (i. e.) heating with or without vacuum to distil off the more volatile impurities. Frequently, the boiling point of the ester is sufficiently low to permit a fractional distillation at reduced pressures.

The new unsaturated carbonates are generally non-resinous compounds having distinct boiling and melting points and are often capable of separation in substantially pure state. Frequently, the impurities are side reaction products which are colorless and transparent esters having characteristics similar to the esters herein contemplated. In such cases, removal of such impurities may be unnecessary where they do not produce any detrimental effect in the use to which the ester is put. The new compounds are usually liquids at room temperature but some, however, are solids. The new unsaturated compounds are usually miscible with solvents such as benzene, toluene, chloroform, diethyl ether, carbon tetrachloride and petroleum ether. The monomeric esters are valuable as plasticizers for various resin materials such as styrene, cellulose, vinyl, urea, protein, phenolic, or acrylic resins. Other uses such as solvents, insecticides, and liquid coating compositions are noteworthy.

These esters may be polymerized in the presence of heat, light, or catalysts such as oxygen, ozone, or organic peroxides such as lauroyl, benzoyl and acetone peroxides, to yield solid or liquid compositions of widely differing physical properties. The polymerized products vary in properties depending upon the structure of the ester and upon the degree of polymerization.

The polyunsaturated esters contain at least three radicals derived from unsaturated alcohol and are capable of polymerization to a fusible intermediate stage and finally to a substantially infusible and/or insoluble form. The completely polymerized polyunsaturated compounds are, in general, substantially unaffected by acids, alkalies, water, and organic solvents. Intermediate polymers derived from the polyunsaturated esters having a wide range of properties may be secured by incomplete polymerization. The polymers thus obtained are transparent and colorless, although they may at times have a slightly yellow color, especially when polymerized completely. Many of these new polymers are generally tougher and more resistant to shattering than are the unsaturated alcohol esters of polybasic acids.

Upon the initial polymerization of the polyunsaturated esters in liquid monomeric state, or in a solution of the monomer in suitable solvents, an increase in the viscosity of the liquids is noticeable due to the formation of a simple polymer which is soluble in the monomer and in solvents such as acetone, benzene, xylene, dioxane, toluene, or carbon tetrachloride. Upon further polymerization, the liquid sets up to form a soft gel containing a substantial portion of a polymer which is insoluble in the monomer and organic solvents and containing as well, a substantial portion of a soluble material which may be monomer and/or soluble, fusible polymer. These gels are soft and bend readily. However, they are fragile and crumble or tear under low stresses. They may be further polymerized in the presence of catalysts to the final infusible insoluble state in which substantially all of the polymer is substantially infusible and substantially insoluble in organic solvents, acids, and alkalies.

The monomers of the polyunsaturated esters may be cast polymerized directly to the substantially insoluble, infusible state. This procedure is subject to certain inherent difficulties due to the strains which are established during polymerization of the gel and which frequently result in fractures as the final hard form is attained. It has been discovered that these difficulties may be avoided by releasing the strains established in the gel before the fracturing can occur. This may be done by permitting the strains to be relieved before the polymerization is complete, either periodically or by conducting the polymerization under conditions which permit gradual release of these strains. For example, the polymerization may be conducted in a simple mold until a soft firm gel has formed. At this point the polymer may be freed from the mold to which it adheres strongly. When released the polymer contracts substantially, thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to permit the complete decomposition of the peroxide catalyst. This temperature is dependent upon the catalyst used. For benzoyl peroxide temperatures of 65 to 80° C. are suitable while for acetone peroxide temperatures of 140–150° C. may be used. In accordance with one modification, the gel, after it is freed from the mold, may be coated on both sides with monomer or the syrupy polymer. The coated article is then polymerized between smooth heated plates to the final insoluble state.

In order to inhibit formation of cracks during the initial polymerization, it is frequently desirable to minimize the polymerization on one side of the sheet. This is done by conducting the polymerization with one side exposed to the air which inhibits polymerization in the presence of a peroxide catalyst, such as benzoyl peroxide. Thus, a sheet is produced which is hard and smooth on one side while being soft and tacky on the other. The sheet may then be finished by coating the tacky side with monomer or syrupy polymer and polymerizing it in contact with a smooth plate to the insoluble, infusible state. Often it is found desirable to release the polymer from the plate one or more times during polymerization of the coating in order to minimize formation of cracks or other surface defects.

Cast polymers may be also prepared by a single step polymerization directly to the insoluble infusible state. The monomer may be mixed with one to five percent of benzoyl or other organic peroxide and heated at 50–60° C. until it becomes partly polymerized and thickened to an increased viscosity of 100 to 1000 percent of the monomer viscosity. The thickened monomer may then be polymerized between glass, metal, or similar plates which are separated by compressible gaskets or retainers of Koroseal (plasticized polyvinyl chloride), butadiene polymers, polyvinyl alcohol, Thiokol (polyethylene sulfide), rubber, or similar materials arranged about the edge of such plates. The thickened monomer may be poured on one glass plate within the confines of the flexible retainer, laid about 2 inches from the edge of the plate. The second glass plate may then be carefully laid on top, taking care to avoid the trapping of air bubbles under the top plate. When the top plate is in position, both plates may be held together by means of suitable clamps which are capable of applying pressure upon the plates and are placed directly over the flexible retainer. The entire assembly is then placed in an oven and heated at 70 to 100° C. where the polymerization is continued. During the polymerization the resin shrinks and tends to draw away from the glass surfaces. To prevent fractures pressure is maintained upon the plates to depress the flexible container and permit the plates to remain in contact with the polymerizing resin. This pressure may be maintained by periodically tightening the clamps or by use of spring clamps which maintains a uniform pressure throughout the polymerization process.

By an alternative procedure for cast polymerizing sheets, the molds may be assembled before the thickened monomer is poured. Thus, the flexible compressible retainer may be inserted between the plates and held in place by suitable clamps located around the edge of the plates. This retainer or gasket is placed adjacent the edge of the plates and a suitable opening may be provided between the ends of the flexible retainer, preferably at one corner of the mold. The assembled mold is then placed in a vertical position with the open corner uppermost. The thickened monomer containing one to four percent residual peroxide is then poured in slowly until the entire mold is filled. After standing until all of the entrapped air has separated the mold is heated uniformly between 70 and 100° C. to continue the polymerization. Pressure is maintained upon the plates to insure the contact of glass and resin during polymerization by suitable means such as by tightening the clamps periodically or by maintaining a uniform pressure upon the plates throughout by means of spring clamps. When the resin has been completely polymerized it is separated from the glass plates and a hard, transparent, colorless and durable resin sheet is obtained.

Other methods have been developed for polymerization of the compounds herein contemplated while avoiding formation of cracks and fractures. By one of these methods the polymerization may be suspended while the monomer-polymer mixture is in the liquid state and before the polymer is converted to a gel by cooling, removal from exposure to ultraviolet light, by adding inhibiting materials such as pyrogallol, hydroquinone, aniline, phenylene diamine, or sulphur, or by destruction of the polymerization catalyst. The fusible polymer may be separated from all or part of the monomer by any of several methods. It may be precipitated by the addition of nonsolvents for the fusible polymer such as water, ethyl alcohol, methyl alcohol, or glycol. Alternatively, it may also be separated from the monomer by distillation in the presence of an inhibitor for polymerization and preferably at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer. Preferably, the polymers of the new esters are produced by heating the monomer or a solution thereof in the presence of substantial quantities, for example, 2 to 5 percent of benzoyl peroxide until the viscosity of the solution has increased about 100 to 500 percent. This may require from one-half to two hours while heating at 65 to 85° C., in the presence of benzoyl peroxide. The resulting viscous solution is poured into an equal volume of water, methyl or ethyl alcohols, glycol or other non-solvent for the fusible polymer. A polymer usually in the form of a powder or a gummy precipitate is thus formed which may be filtered and dried. This permits substantially complete separation of a soluble fusible polymer from unpolymerized monomer.

Often, however, such complete separation is not desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In general, the composition should contain at least 40 percent and preferably in excess of 50 percent fusible polymer and from about 5 percent to 50 or 60 percent monomer.

Preferably, the production of these materials is conducted by treatment of a solution of the monomer in a solvent for monomer and polymer such as benzene, xylene, toluene, carbon tetrachloride, acetone, or other solvent which normally dissolves vinyl polymers.

Other polymerization methods may involve the interruption of the polymerization while the polymer is a gel. For example, a soft solid gel containing a substantial portion of fusible polymer may be digested with a quantity of solvent for the fusible polymer to extract the fusible gel from the infusible. The solution may then be treated as above described to separate the fusible polymer from the solvent. These polymers may be used as molding or coating compositions. Due to their solubility, they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulverulent form and used as a molding powder. Alternatively, then, a desirable polymer may be prepared by emulsifying the monomer or a syrupy polymer in an aqueous medium with or without a suitable emulsification agent such as polyvinyl alcohols, polyallyl alcohols, etc., and then polymerizing to the point where the gel precipitates. This polymer may be separated and used as molding powder.

The solid forms of the fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of benzoyl peroxide, generally in a heated mold. The polymers may be mixed with fillers such as alpha cellulose, wood pulp, and other fibrous substances, mineral fillers or pigments such as zinc oxide, calcium carbonate, lead chromate, magnesium carbonate, calcium silicate, etc.; plasticizers such as the saturated alcohol esters of maleic, fumaric, succinic, and adipic acids or di- or tri-ethylene glycol bis(butyl carbonate). The polymeric molding powder may be copolymerized with phenolic, cellulose acetate, urea, vinylic, protein, or acrylic resins. It is thus possible to produce transparent or opaque forms of a wide variety of colors and hardnesses, depending upon the proper selection of the modifying agents.

The fusible polymers may be dissolved in suitable solvents, and used as coating and impregnating compositions. For example, the solution of dispersion of fusible polymer in monomer or other organic solvent such as benzene, toluene, chloroform, acetone, dioxane, carbon tetrachloride, phenyl Cellosolve, dichlorethyl ether, dibutyl phthalate, or mixtures thereof, is useful as a liquid coating composition. Objects of paper, metal, cloth, wood, leather, or synthetic resins may be coated with the solution of polymer in solvent and subsequently polymerized to yield attractively finished coatings. Similarly, porous objects of felt, cloth, leather, paper, etc., either in single layers or laminated, may be impregnated with the dissolved fusible polymer and subjected to the polymerization to the final insoluble infusible state. Other molding powders may be prepared from the new esters without first converting them to the intermediate polymer. The monomer may be mixed directly with a suitable filler such as magnesium carbonate, cellulose pulp, asbestos, etc., in a ball mill or other mixing device. By proper selection of proportions, a dry pulverulent powder can be obtained which is capable of polymerization under the influence of heat and pressure to a glossy solid polymer of high tensile strength. The use of too much filler will cause a non-glossy finish and the use of too much monomer will make the powder moist and difficult to handle. Sometimes it may be desirable to precure the molding powder by subjecting it to a moderate temperature, 50 to 70° C. for a limited period of time, for example, one to three hours. This precuring operation is a partial polymerization and permits a dry molding powder where the same proportions of monomer might otherwise result in a moist molding composition.

Further details of the synthesis of these new esters and of their applications will be apparent from the following examples.

*Example I*

Allyl chloroformate was prepared by placing 500 cc. of allyl alcohol in a flask equipped with a stirring device and bubbling phosgene through it at such a rate as would permit a rapid reaction without raising the temperature above 10 to 15° C. The flask was provided with an ice bath. When approximately a molar quantity of phosgene had been added, the reaction was discontinued and the crude material was permitted to stand at room temperature to separate the excess phosgene. The reaction mixture was washed with water to remove the excess allyl alcohol and the allyl chloroformate was distilled in vacuum (B. P. 46–51° at 80 mm.).

One mole (120 gms.) of allyl chloroformate was added slowly to 53 gms. of diethylene glycol and 100 gms. of pyridine. The chloroformate addition required about one-half hour during which time the reaction mass was maintained between +5 and +15° C. The resulting mixture was washed with dilute hydrochloric acid and with water and purified by distillation in a vacuum. The resulting diethylene glycol bis(allyl carbonate) had an index of refraction ($N_D^{20}$) of 1.4486, a density of ($D_4^{20}$) of 1.132–1.140, and the following structure:

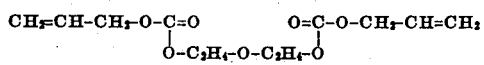

A quantity of 100 gms. of this compound was heated at 50° C. in a solution of 200 cc. of carbon tetrachloride with 2 percent benzoyl peroxide until the viscosity had increased about 200 percent. 500 cc. of methyl alcohol was added and a gummy polymer was precipitated. After filtering and drying, a 5 gm. sample of the soft polymer was mixed with 5 percent benzoyl peroxide and pressed in a mold at a pressure of 2000 pounds per square inch at a temperature of 150° C. A hard, colorless, transparent polymer was produced.

*Example II*

Methallyl chloroformate was prepared by passing phosgene into 500 cc. of methallyl alcohol at a rate of 50–65 millimoles per minute. The mass was stirred throughout the reaction and maintained at a temperature between 5° C. and 10° C. by means of an ice bath. When approximately an equimolar quantity of phosgene had been absorbed, the reaction was stopped and the product was washed with dilute hydrochloric acid and salt solution (NaCl). The methallyl chloroformate was distilled at 126–136° C. (760 mm.) 134 gms. of the chloroformate was added dropwise to 31 gms. of ethylene glycol and an excess (100 gms.) of pyridine. The temperature was maintained below +10° C. during the reaction by means of an ice bath. The ethylene glycol bis (methallyl carbonate):

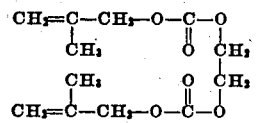

was distilled at 146° (2 mm.). It had an index of refraction ($N_D^{20}$) of 1.4489 and a density of ($D_4^{20}$) of 1.103.

A 100 gram sample of the monomer was diluted with 250 cc. of dioxane and heated at 65° C. for 2 hours. The viscosity had increased appreciably but the mass was still liquid. A half-liter of methyl alcohol was added to precipitate the fusible polymer which was filtered and dried. The polymer was a soft gummy material and after drying it was a non-viscid granular solid.

A five-gram sample was mixed with 5 percent benzoyl peroxide and pressed in a mold at 150° C. and 2000 lb. per square inch pressure. A colorless, transparent, solid polymer was formed.

*Example III*

One mole of glycerine (92 grams) was treated with phosgene at the rate of 50 millimoles per minute for 1½ hours at a temperature of 0–10° C. maintained with an acetone-dry ice mixture. The resulting mixture was warmed to 30° C. and subjected to a reduced pressure to remove the excess phosgene. The glycerol trichloroformate was then treated with crotyl alcohol (150 grams) and an excess of sodium hydroxide at 20–30° C., maintained with an ice bath. A substantial quantity of glycerol tris (crotyl carbonate) was produced, having the structure:

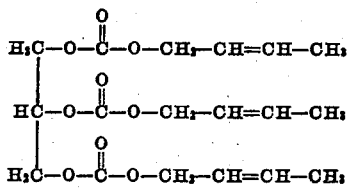

This ester polymerized upon heating with 5 percent benzoyl peroxide at 70° C.

*Example IV*

A sample of 120 grams of methyl glycerine and 500 cc. of benzene was placed in a 2000 cc. flask with 250 grams of pyridine. While the mixture was being stirred, 350 grams of methallyl chloroformate were added at a rate sufficiently slow to prevent the temperature from rising above 50° C. When the addition was completed, the water layer was separated and the oil layer was washed with dilute HCl and with water. The volatile impurities were removed by heating at 50-60 mm. total pressure. The ester was dissolved in 500 cc. benzol, and 5 grams of benzol peroxide was added. The mixture was heated at 50° C. for 3 hours. The viscous solution was poured into 1000 cc. of methyl alcohol and a large quantity of gelatinous polymer was precipitated. A five-gram sample of the dried polymer was mixed with 5 percent benzoyl peroxide. It was heated (160° C.) in a mold under 1500 pounds per square inch pressure. A hard, translucent, and nearly colorless solid was produced. The monomer had the following structure:

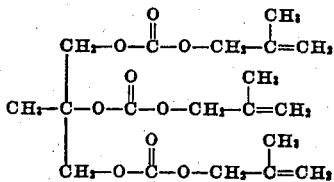

*Example V*

A quantity of glycerine (184 grams) was mixed with 7.8 moles of pyridine in a 3-liter flask equipped with stirrer and reflux condenser. 7.2 moles of allyl chloroformate were added at the rate of 100 millimoles per minute while the temperature was kept below +10° C. by an ice bath. When the reaction was completed, the mixture was permitted to stand overnight and thereby warm to room temperature. The ester mixture was washed with dilute hydrochloric acid, with dilute $Na_2SO_3$, and finally with water. It was then dried with $CaCl_2$ and the low-boiling impurities were evaporated. The glycerol tris (allyl carbonate) thus obtained was a colorless liquid having an index of refraction $N_D^{20}=1.4558$ and a density $d_4^{20}=1.194$.

*Example VI*

Pentaerythritol tetrakis (methallyl carbonate) was prepared by treating 100 gms. of pentaerythritol with 475 grams of methallyl chloroformate, in the presence of 302 grams of pyridine. The reaction was conducted at a temperature between 5 and 15° C. by adding the chloroformate slowly to a mixture of the other reagents. When the reaction was completed the mixture was permitted to warm to room temperature and was washed with dilute hydrochloric acid and twice with water and dried over calcium chloride.

A 2 gm. portion of the ester polymerized to a hard transparent solid by heating to 140° C. with 3 percent benzoyl peroxide. The monomer has the following structure:

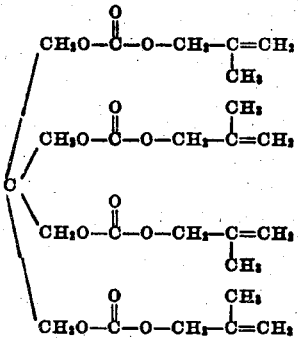

*Example VII*

A fifty gram sample of erythritol was mixed with 200 cc. of dioxane and treated with an excess of phosgene at a temperature of between −5 and +5° C. by cooling with an acetone-dry ice mixture. The tetrachloroformate of erythritol was produced and separated from the dioxane by heating in a vacuum. The chloroformate was then treated with 100 gms. of allyl alcohol and 150 gms. of pyridine at a temperature between 5 and 15° C. as in previous examples. The ester was washed with dilute HCl and with dilute $Na_2CO_3$. A five gram sample was heated with 5 percent benzoyl peroxide and a hard, brittle translucent solid was produced.

*Example VIII*

A quantity of 200 grams of glycerol tris (allyl carbonate) was partially polymerized by heating with 5 percent benzoyl peroxide for 3 hours at 65° C. The ester was thereby thickened to a viscosity of about 500 percent greater than that of the normal monomer.

A mold was prepared by separating two 15" x 15" sheets of polished plate glass with a ¼" x ½" x 50" strip of Koroseal. The strip was laid around the edge of the plates about one inch in from the edge. The ends of the flexible strip were about 2 inches apart with the opening at one corner. The glass plates were clamped together with C clamps placed two inches apart around the periphery and pressing on the plates directly over the flexible gasket. The assembled mold was placed in a vertical position with the open corner uppermost.

The thickened monomer was poured into the mold and allowed to stand for ten minutes to separate the air bubbles. The filled mold was then heated for two hours at 70° C. and the temperature raised gradually to 95° C. over a period of two hours. The temperature was held at two hours and the mold was then removed from the mold and opened. During the heating the clamps were tightened every two hours to restore the pressure on the polymer, the loss of which pressure was caused by the shrinkage of the gel. A transparent and nearly colorless sheet of resin was produced.

*Example IX*

Pentaerythritol tetrakis (allyl carbonate) was thickened by heating with 4 percent benzoyl peroxide for three hours at 65° C. The thickened monomer contained 2.3 percent residual peroxide. Three-hundred grams of the thickened monomer was mixed with 100 grams of cellulose pulp and one gram of Chinese blue pigment in a porcelain ball mill with porcelain balls. The charged ball mill was placed in an oven at 70° C. and operated for 6 hours. When the product was pulverized a uniform molding powder resulted.

A thirty gram sample was mixed with 2 percent benzoyl peroxide and pressed at 2000 pounds per square inch in a heated (125° C.) mold for 2 hours. A strong, uniform, light blue, solid polymer was produced.

Although the present invention has been described with respect to certain specific modifications, it is not intended that the details of these modifications shall be limitations upon the invention except as incorporated in the following claims.

This case is a continuation-in-part of Serial No. 361,280, filed October 15, 1940, by Irving E. Muskat and Franklin Strain and Serial No. 403,703, filed July 23, 1941, by Irving E. Muskat and Franklin Strain.

We claim:

1. Glycerol tris (allyl carbonate).
2. Pentaerythritol tetrakis (methallyl carbonate).
3. A polymer of glycerol tris (allyl carbonate).
4. A polymer of pentaerythritol tetrakis (methallyl carbonate).
5. An ester having the structural formula:

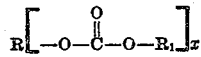

wherein R is a saturated aliphatic hydrocarbon radical having a valence of $x$, $R_1$ is a radical corresponding to the radical $R_1$ in the alcohol $R_1OH$, said alcohol being an unsaturated monohydric alcohol having from 3 to 10 carbon atoms and having an olefinic bond between the beta and gamma carbon atoms therein, and $x$ is a small whole number greater than 2 and less than 7.

6. The compound of claim 5, wherein the unsaturated alcohol is allyl alcohol.
7. The compound of claim 5, wherein the unsaturated alcohol is methallyl alcohol.
8. The compound of claim 5, wherein the unsaturated alcohol is 2-chloroallyl alcohol.
9. A polymer of the compound of claim 5.

IRVING E. MUSKAT.
FRANKLIN STRAIN.